US010495245B2

(12) United States Patent
Smith, III (10) Patent No.: US 10,495,245 B2
(45) Date of Patent: Dec. 3, 2019

(54) PRESSURE-ENERGIZED PROBE SEAL FOR FEMALE HYDRAULIC COUPLING MEMBER

(71) Applicant: National Coupling Company, Inc., Stafford, TX (US)

(72) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 118 days.

(21) Appl. No.: 15/660,539

(22) Filed: Jul. 26, 2017

(65) Prior Publication Data

US 2017/0321833 A1    Nov. 9, 2017

Related U.S. Application Data (60) Division of application No. 14/182,180, filed on Feb. 17, 2014, which is a division of application No. 12/913,484, filed on Oct. 27, 2010, now Pat. No. 9,841,130, which is a continuation-in-part of application No. 12/113,772, filed on May 1, 2008, now Pat. No. 7,954,859, which is a continuation-in-part of application No. 12/413,281, filed on Mar. 27, 2009, now Pat. No. 8,087,700, (Continued)

(51) Int. Cl.
| | |
|---|---|
| *F16L 29/02* | (2006.01) |
| *F16L 37/02* | (2006.01) |
| *F16L 1/26* | (2006.01) |
| *F16L 17/03* | (2006.01) |
| *F16J 15/02* | (2006.01) |
| *F16K 5/06* | (2006.01) |

(52) U.S. Cl.
CPC ............ *F16L 37/025* (2013.01); *F16J 15/021* (2013.01); *F16K 5/0673* (2013.01); *F16L 1/26* (2013.01); *F16L 17/032* (2013.01); *F16L 29/02* (2013.01)

(58) Field of Classification Search
CPC ....... F16K 5/0673; F16L 37/025; F16L 29/02; F16L 17/03; F16L 17/032; F16L 17/035; F16J 15/021
USPC .......................................... 285/110, 111, 112
See application file for complete search history.

(56) References Cited

U.S. PATENT DOCUMENTS 4,572,515 A * 2/1986 Grazioli ................ F16K 5/0673
251/317
4,747,606 A    5/1988 Jennings
(Continued)

FOREIGN PATENT DOCUMENTS

FR    2299586 A1 *    8/1976    ........... B29C 57/025

*Primary Examiner* — David Bochna
*Assistant Examiner* — James A Linford
(74) *Attorney, Agent, or Firm* — Blank Rome LLP (57) ABSTRACT

A probe seal for a female hydraulic coupling member has both internal and external pressure-energized seals. The outer wall or opposing ends of the seal have one or more pressure-energized seals for sealing between the body of the probe seal and the body of a coupling member in which the probe seal is installed. Annular, L-shaped, T-shaped or angled grooves in the inner wall of the seal form cavities and sealing projections that can be urged in an inward, radial direction by fluid pressure within an associated cavity to increase the sealing effectiveness between the body of the seal and the probe of a male hydraulic coupling member inserted in the receiving chamber of the female coupling member.

1 Claim, 4 Drawing Sheets

Related U.S. Application Data which is a continuation-in-part of application No. 12/757,504, filed on Apr. 9, 2010, now abandoned.

(56) References Cited

U.S. PATENT DOCUMENTS

| | | | | |
|---|---|---|---|---|
| 5,058,906 A | * | 10/1991 | Adamek | F16J 15/0887 277/614 |
| 5,469,887 A | | 11/1995 | Smith, III | |
| 7,575,256 B2 | | 8/2009 | Smith, III | |
| 2009/0273181 A1 | * | 11/2009 | Smith, III | F16L 1/26 285/108 |

* cited by examiner

PRESSURE-ENERGIZED PROBE SEAL FOR FEMALE HYDRAULIC COUPLING MEMBER

CROSS-REFERENCE TO RELATED APPLICATIONS

This application is a division of U.S. patent application Ser. No. 14/182,180 filed Feb. 17, 2014, which is a division of U.S. patent application Ser. No. 12/913,484 filed Oct. 27, 2010, which is a continuation-in-part of U.S. patent application Ser. No. 12/113,772 filed May 1, 2008, and entitled "Probe seal having pressure-energized sealing elements for female hydraulic coupling member" (now issued as U.S. Pat. No. 7,954,859) the disclosure of which is hereby incorporated by reference in its entirety. Application Ser. No. 12/913,484 is also a continuation-in-part of U.S. patent application Ser. No. 12/413,281 filed Mar. 27, 2009, and entitled "Hydraulic coupling member with bidirectional pressure-energized probe seal" (now issued as U.S. Pat. No. 8,087,700) the disclosure of which is hereby incorporated by reference in its entirety. Application Ser. No. 12/913,484 is also a continuation-in-part of U.S. patent application Ser. No. 12/757,504 filed Apr. 9, 2010, and entitled "Pressure-energized probe seal for female hydraulic coupling member" the disclosure of which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

This invention relates to hydraulic coupling members. More particularly, it relates to seals used to seal between the probe of a male subsea hydraulic coupling member and the body of a female subsea hydraulic coupling member.

2. Description of the Related Art Including Information Disclosed Under 37 CFR 1.97 and 1.98

A wide variety of hydraulic coupling members are known in the art. Typically, a coupling is comprised of two members—a male member having a generally cylindrical probe and a female member having a receiving chamber equipped with one or more seals for providing a fluid-tight seal with the outer surface of the probe element of the male member.

For high-temperature, high-pressure applications, a probe seal having a dovetail interlocking fit with the body of a female coupling member has proven to be a particularly effective configuration. In certain coupling members, the probe seal has a dovetail interlocking fit with a seal retainer or seal cartridge in the female coupling member.

U.S. Pat. Nos. 5,099,882 and 5,203,374 disclose a pressure balanced hydraulic coupling with a variety of seals having a dovetail interlocking fit that prevents radial movement of the seal into the bore. This pressure balanced coupling has radial passageways communicating between the male and female members such that substantial fluid pressure is not exerted against the face of either member during coupling or uncoupling or during the coupled state. Radial passageways in the male and female members match up at their longitudinal surfaces so that fluid pressure between the male and female members is in a substantially radial direction and is not exerted at the face of either member. A first pair of seals is positioned on each side of the radial passage for sealing between the receiving chamber and the seal retainer. A second pair of seals is positioned on each side of the radial passage for sealing between the seal retainer and the male member.

U.S. Pat. No. 5,390,702 discloses an undersea hydraulic coupling having a male member with a stepped outer body that is inserted into a female member having a bore with stepped internal cylindrical surface. The step in the male member defines first and second external cylindrical surfaces which are slidably received in the female member bore and in a sleeve member before the seals, which are retained by the sleeve member, engage the male member. Thus, the male member is more accurately positioned and guided into the seals, insuring greater seal reliability and longer seal life. The stepped surfaces also help prevent implosion of the seals due to sea pressure when the end of the male member comes out of the seals.

U.S. Pat. No. 6,123,103 discloses another pressure balanced hydraulic coupling for use in undersea drilling and production operations which is equipped with dovetail type seals. The female member has a split body with a first part and a second part, each having a longitudinal passage and a radial fluid passage. A radial seal is positioned on the junction between the first and second parts of the female member body to facilitate removal and replacement of the radial seal when the split body is disassembled. The male member may be inserted through the first and second parts of the female coupling member, thereby establishing fluid communication between the coupling members in a direction transverse to the coupling member bores.

U.S. Pat. No. 6,206,040 discloses another undersea hydraulic coupling with seals having a dovetail profile. This undersea hydraulic coupling has a stepped internal bore dimensioned to increase the flow rate through the coupling. The coupling allows an increased flow rate without increasing the size or weight of the coupling by positioning the poppet valve in the body section, rather than in the probe section, of the male coupling member.

U.S. Pat. No. 6,575,430 discloses an undersea hydraulic coupling member having a ring-shaped seal with multiple sealing surfaces that extend inwardly from the inner surface in a radial direction. The multiple sealing surfaces help guide the probe of the male coupling member into the female member without the risk of drag or galling of the receiving chamber or metal seal retained therein. The seal has reverse inclined shoulders which provide an interlocking fit in the female member to restrain the seal from moving radially inwardly due to vacuum or low pressure in the receiving chamber. One particular embodiment of the ring-shaped seal includes a third radial sealing surface that may be pressure energized by hydraulic fluid pressure in the coupling to enhance the radial seal with the probe of the male coupling. As hydraulic fluid at high pressure enters a cavity, the third sealing surface is urged in an inward, radial direction against the outer surface of the male probe.

U.S. Pat. No. 4,190,259 describes a single apex, two element, fluid pressure seal assembly that has a convergingly tapered surface defining a central vertex or apex that projects radially from the seal body. The vertex creates a narrow contact dynamic seal area between the apex and the surface of an adjacent machined part. Seals of this type are available from Microdot Manufacturing, Inc. (Salt Lake City, Utah 84120) under the CROWN SEAL® brand name.

U.S. Pat. No. 6,179,002 describes an undersea hydraulic coupling with a pressure-energized dovetail seal. The seal has a pair of flexible sealing surfaces for sealing with the male and female coupling members, and a cavity there between that is exposed to fluid pressure in the coupling. The outer circumference of the seal has a dovetail interfit between inclined shoulders in the female member bore and on a seal retainer that holds the seal in the bore.

U.S. Pat. Nos. 5,052,439 and 4,900,071 describe an undersea hydraulic coupling which includes a male member and female member, and a two-piece retainer for restraining radial movement of a wedge-shaped annular seal into the central bore of the female member. The two-piece retainer includes a cylindrical retainer sleeve member slidably received within the female member bore, and a threaded retainer-locking member threadable to mating threads in the wall of the central bore. The retainer-locking member holds the retainer sleeve member in place within the female member bore. The annular seal is restrained from radial movement by a dovetail interlocking fit with a mating shoulder on at least one of the retainer sleeve and the retainer-locking members.

U.S. Patent Publication Nos. 2009/0273144 A1 and 2009/0273181 A1 disclose probe seals for a female hydraulic coupling member that have one or more circumferential pressure-energized seals for sealing between the probe seal and the body of the coupling member. An annular cavity in the side wall of the probe seal is open to the outer cylindrical surface of the generally ring-shaped probe seal. Hydraulic fluid, under pressure, can enter the annular cavity through the opening and exert a radial force on sealing elements. In certain embodiments, the annular cavity is generally L-shaped in cross section; in other embodiments, the annular cavity is generally T-shaped in cross section. In some embodiments, a pressure differential also imparts an inwardly-directed radial force to the crown seal.

BRIEF SUMMARY OF THE INVENTION

A [crown-type] probe seal for a female hydraulic coupling member has one or more pressure-energized seals for sealing between the body of the probe seal and the body of a coupling member which retains the probe seal. In certain embodiments, the generally ring-shaped probe seal has an annular fluid chamber in one or both end walls of the body of the seal. Hydraulic fluid under pressure may enter the annular fluid chamber and exert a generally radial force in response to a pressure differential. This radial force can act to increase the sealing effectiveness of the probe seal to the body of the female coupling member having such a probe seal. In "negative pressure" situations (i.e., when the ambient pressure exceeds the internal fluid pressure), seawater may enter an annular fluid chamber on the opposing end of the probe seal and similarly act to increase the sealing effectiveness of the probe seal to the body of the female coupling member.

Annular, L-shaped or T-shaped grooves in the inner wall of the seal form cavities and sealing projections that can be urged in an inward, radial direction by fluid pressure within an associated cavity to increase the sealing effectiveness between the body of the seal and the probe of a male hydraulic coupling member inserted in the receiving chamber of the female coupling member.

In other embodiments of the invention, annular, T-shaped grooves in the outer wall of the seal form cavities and sealing projections that can be urged in an outward, radial direction by fluid pressure within an associated cavity to increase the sealing effectiveness between the body of the seal and the inner wall of the central axial bore [receiving chamber] of a female hydraulic coupling member.

DETAILED DESCRIPTION OF THE INVENTION

The invention may best be understood by reference to certain illustrative embodiments shown in the drawing figures wherein like reference numbers are used to refer to like elements.

Figure 1:
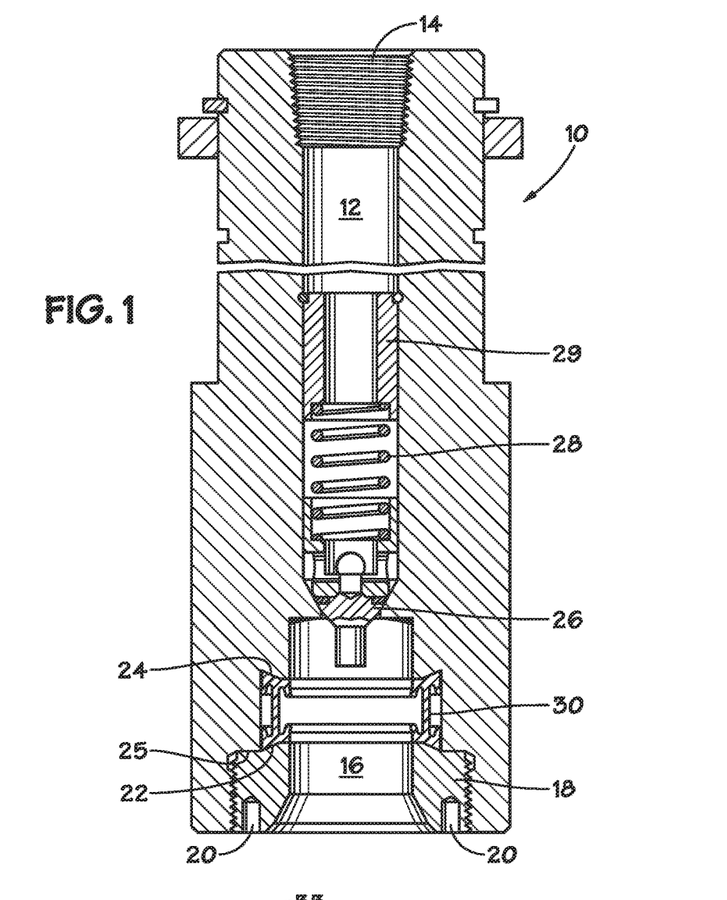
FIG. 1 is a cross-sectional view of a female hydraulic coupling member having a probe seal according to a first embodiment.

Referring to FIG. 1, female hydraulic coupling member 10 comprises a generally cylindrical body with central axial bore 12. Optionally, one end of the coupling may be provided with means for connection to a hydraulic line or the like. In the illustrated embodiment, the connection means comprises threaded portion 14 of bore 12. The opposing end of coupling 10 has an enlarged portion of central bore 12 which forms receiving chamber 16 into which the probe of a corresponding male hydraulic coupling may be inserted. The female coupling 10 illustrated in FIG. 1 is configured to receive a cylindrical male probe having an outside diameter slightly smaller than the inside diameter of the innermost portion of receiving chamber 16.

Coupling member 10 is also shown equipped with optional poppet valve 26 which is biased to the closed position by poppet spring 28 bearing against spring stop 29 within bore 12. Poppet valve 26 may prevent the loss of hydraulic fluid from within the coupling and the entry of seawater into the coupling when a male coupling member is not coupled to coupling 10.

Central axial bore 12 has a stepped inside diameter with shoulders (some angled; some straight) between the various sections of differing diameters. Of particular note is angled shoulder 24 in bore 12. Probe seal 30 has a corresponding angled shoulder which bears against shoulder 24. Threaded retainer nut 18 has angled surface 22 on at least a portion of its inner face. Angled surface 22 may be a mirror image of angled shoulder 24. Retainer nut 18 may be provided with one or more pairs of spanner engagement holes 20 to permit the use of a spanner in seating and removing retainer nut 18.

Figure 2:
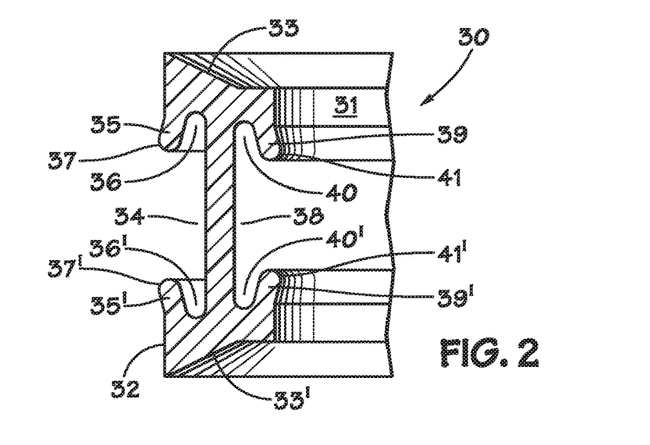
FIG. 2 is an enlarged, cross-sectional view of the probe seal shown in FIG. 1.

Pressure-energized probe seal 30 is shown with enhanced detail in FIG. 2. Probe seal 30 is comprised of a generally ring-shaped body having a central axial opening. The body has inner wall 31, outer wall 32 and opposing ends which comprise angled surfaces 33 and 33'. Seal 30 may be symmetric about its midline.

Pressure-energized seals are provided on both the inner and outer surfaces of seal 30. A pair of opposed, pressure-energized seals on the outer surface of seal 30 are formed by a generally T-shaped groove 34 in outer wall 32. Sealing projections (or "lips") 35 and 35' may be angled slightly outwardly from outer wall 32 to preload the seals when seal 30 is installed in a female coupling member. Fluid chambers 36 and 36' are provided immediately inboard of sealing projections 35 and 35', respectively.

On the inner surface of seal 30, generally T-shaped groove 38 in inner wall 31 forms sealing projections (or "lips") 39 and 39'. Fluid chambers 40 and 40' are provided immediately inboard of sealing projections 39 and 39', respectively.

As will be appreciated by those skilled in the art, fluid pressure within chamber 36 acts to urge sealing projection 35 in an outward, radial direction thereby increasing the sealing effectiveness at sealing surface 37. Likewise, fluid pressure within chamber 40 acts to urge sealing lip 39 in an inward, radial direction, thereby increasing the sealing effectiveness at sealing surface 41.

When installed in female coupling member 10, angled surfaces 33 and 33' engage angled shoulder 24 and angled surface 22 in a dovetail interfit when retainer nut 18 is fully seated on shoulder 25. Implosion of seal 30 into receiving chamber 16 is thereby inhibited during negative pressure events—i.e., when the pressure within receiving chamber 16 is less than the ambient pressure (such as may occur upon withdrawal of a male probe from receiving chamber 16).

Probe seal 30 may be fabricated of any suitable material and may be formed by any suitable method including, but not limited to, molding and machining. One particularly preferred material for probe seal 50 is polyetheretherketone (PEEK). Additional examples of suitable materials include DELRIN™ acetal resin engineering plastic, TEFLON™ polytetrafluoroethylene (PTFE), glass-filled PTFE, PEEK-filled PTFE, and similar, relatively soft, machinable polymers.

Operation of pressure-energized seal 30 will now be described. Because seal 30 is symmetric about its midline (and may therefore be inserted in coupling 10 in either direction), in the following description, the elements designated with the prime symbol (e.g., 35' and 39') are those proximate retainer nut 18 and those corresponding elements without the prime symbol (e.g., 36 and 40) are those proximate shoulder 24 in coupling 10.

In operation under positive pressure conditions—i.e., when the pressure of the hydraulic fluid within the coupling exceeds the ambient pressure (most commonly that produced by the hydrostatic head of the surrounding seawater)—hydraulic fluid enters chamber 36' and urges the outer sealing projection 35' in an outward, radial direction, thereby increasing the contact pressure (and hence, sealing effectiveness) between sealing surface 37' and the opposing inner wall of central axial bore 12.

Likewise, hydraulic fluid under pressure will enter chamber 40' and urge inner sealing projection 39' in an inward, radial direction, thereby increasing the contact pressure (and hence, sealing effectiveness) between sealing surface 41' and the opposing outer surface of a male probe member seated in receiving chamber 16.

In operation under negative pressure conditions—i.e., when the pressure of the hydraulic fluid within the coupling is less than the hydrostatic head—seawater enters chamber 36 and urges the outer sealing projection 35 in an outward, radial direction, thereby increasing the contact pressure (and hence, sealing effectiveness) between sealing surface 37 and the opposing inner wall of central axial bore 12.

Likewise, seawater will enter chamber 40 and urge inner sealing projection 39 in an inward, radial direction, thereby increasing the contact pressure (and hence, sealing effectiveness) between sealing surface 41 and the opposing outer surface of a male probe member seated in receiving chamber 16.

Figure 3A:
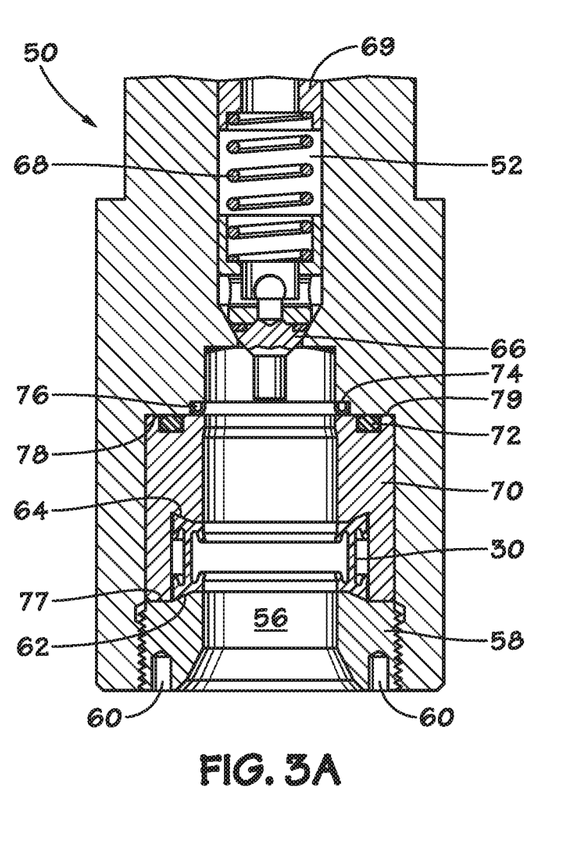
FIG. 3A is a cross-sectional view of the probe seal of FIG. 2 shown installed in a female coupling member having a seal retainer.
Figure 3B:
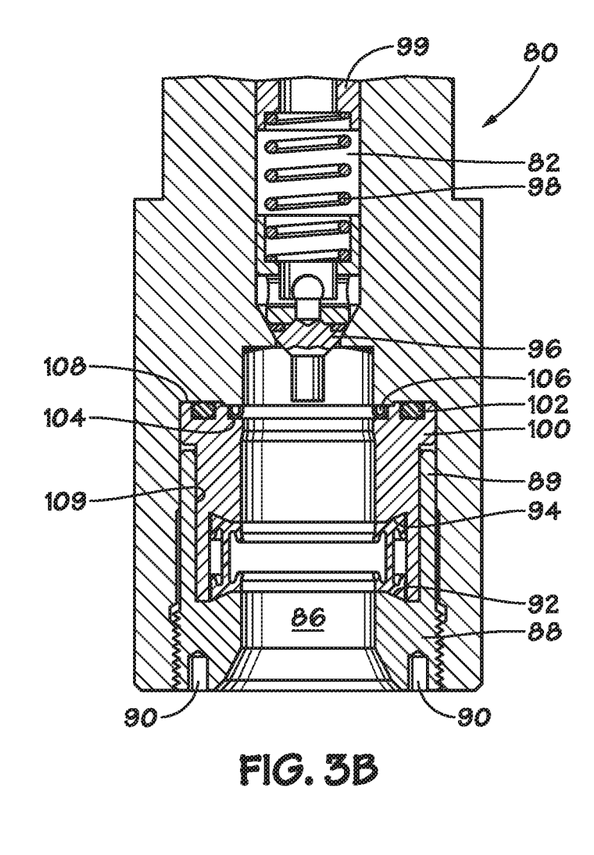
FIG. 3B is a cross-sectional view of the probe seal of FIG. 2 shown installed in a female coupling member having a seal cartridge.

The use of probe seal 30 in female coupling members of alternative design is illustrated in FIGS. 3A and 3B. Female coupling member 50 (shown in FIG. 3A) additionally comprises a seal retainer 70 and a pressure-energized metal C-seal 76. Female coupling member 80 (shown in FIG. 3B) additionally comprises a seal cartridge comprised of seal retainer 100 and shell 88 as well as a pressure-energized metal C-seal 106.

Referring to FIG. 3A, female hydraulic coupling member 50 comprises a generally cylindrical body with central axial bore 52. Optionally, one end of the coupling may be provided with means for connection to a hydraulic line or the like (not shown). The opposing end of coupling 50 has an enlarged portion of central bore 52 which forms receiving chamber 56 into which the probe of a corresponding male hydraulic coupling may be inserted. The female coupling 50 illustrated in FIG. 3A is configured to receive a cylindrical male probe having an outside diameter slightly smaller than the inside diameter of the innermost portion of receiving chamber 56.

Coupling member 50 is also shown equipped with optional poppet valve 66 which is biased to the closed position by poppet spring 68 bearing against spring stop 69 within bore 52. Poppet valve 66 may prevent the loss of hydraulic fluid from within the coupling and the entry of seawater into the coupling when a male coupling member is not coupled to coupling 50.

Central axial bore 52 has a stepped inside diameter with shoulders between the various sections of differing diameters. Of particular note is shoulder 74 in bore 52. Pressure-energized probe seal 76 is installed on shoulder 74. In the illustrated example, probe seal 76 is a metal C-seal. Probe seal 76 is held on shoulder 74 by inner end 79 of seal retainer 70. Seal retainer 70 is held against shoulder 78 by retainer nut 58. Inner end 79 of seal retainer 70 may have an annular groove into which an O-ring seal 72 (or similar such seal) may be inserted for sealing between the body of coupling 50 and seal retainer 70.

Seal retainer 70 may include angled shoulder 64 sized and configured to engage angled surface 33' of probe seal 30. The inner end of retainer nut 58 may include angled surface 62 which is similarly sized and configured to engage angled surface 33 of probe seal 30. Angled surface 62 may be a mirror image of angled shoulder 64. A non-angled portion of the inner face of threaded retainer nut 58 may bear against outer end 77 of seal retainer 70, holding it on shoulder 78. Retainer nut 58 may be provided with one or more pairs of spanner engagement holes 60 to permit the use of a tool in seating and removing retainer nut 58.

Referring to FIG. 3B, female hydraulic coupling member 80 comprises a generally cylindrical body with central axial bore 82. Optionally, one end of the coupling may be provided with means for connection to a hydraulic line or the like (not shown). The opposing end of coupling 80 has an enlarged portion of central bore 82 which forms receiving chamber 86 into which the probe of a corresponding male hydraulic coupling may be inserted. The female coupling 80 illustrated in FIG. 3A is configured to receive a cylindrical male probe having an outside diameter slightly smaller than the inside diameter of the innermost portion of receiving chamber 86.

Coupling member 80 is also shown equipped with optional poppet valve 96 which is biased to the closed position by poppet spring 98 bearing against spring stop 99 within bore 82. Poppet valve 96 may prevent the loss of hydraulic fluid from within the coupling and the entry of seawater into the coupling when a male coupling member is not coupled to coupling 80.

Central axial bore 82 has a stepped inside diameter with shoulders between the various sections of differing diameters. The outermost portion of bore 82 may be internally threaded to engage a corresponding portion of shell 88.

Female coupling member 80 includes a seal cartridge comprised of seal retainer 100 and cartridge shell 88. Extension 89 may be an interference fit with reduced o.d. diameter portion 109 of retainer 100 such that removal of shell 88 (e.g., by unscrewing) also effects withdrawal of retainer 100. Retainer 100 and shell 88 may each have angled shoulders sized and configured to engage angled surfaces 33 and 33' on probe seal 30.

Inner end 108 of seal retainer 100 may have a shoulder 104 for holding pressure-energized probe seal 106. In the illustrated example, probe seal 106 is a metal C-seal. Inner end 108 of seal retainer 100 may also have an annular groove into which an O-ring seal 102 (or similar such seal) may be inserted for sealing between the body of coupling 80 and seal retainer 100.

Seal retainer 100 may include angled shoulder 94 sized and configured to engage angled surface 33' of probe seal 30. Shell 88 may include angled shoulder 92 which is similarly sized and configured to engage angled surface 33 of probe seal 30. Angled surface 92 may be a mirror image of angled shoulder 94. A non-angled portion of the shoulder of shell 88 adjacent extension 89 may bear against outer end of seal retainer 100, holding it on the shoulder in bore 82. Retainer 88 may be provided with one or more pairs of spanner engagement holes 90 to permit the use of a tool in seating and removing the seal cartridge comprised of seal retainer 100 and shell 88.

Figure 4:
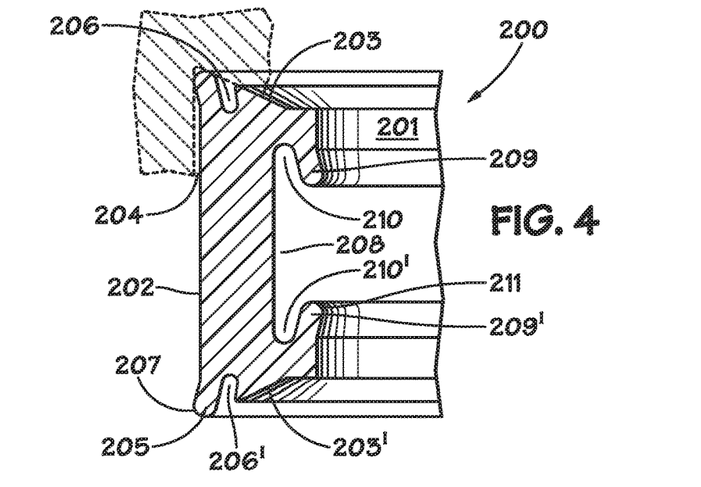
FIG. 4 is a cross-sectional view of a probe seal according to a second embodiment.

A second embodiment of the invention is shown in FIG. 4. The pressure-energized seal on the interior surface of probe seal 200 is the same as that employed by probe seal 30 illustrated in FIGS. 1-4. Specifically, generally T-shaped groove 208 in inner wall 201 forms sealing projections (or "lips") 209 and 209'. Fluid chambers 210 and 210' are provided immediately inboard of sealing projections 209 and 209', respectively.

As will be appreciated by those skilled in the art, fluid pressure within chamber 210 acts to urge sealing lip 209 in an inward, radial direction, thereby increasing the sealing effectiveness at sealing surface 211.

When installed in female coupling member such as 10, 50 or 80, angled surfaces 203 and 203' engage corresponding angled shoulders and/or angled surfaces in the coupling body in a dovetail interfit. Implosion of seal 200 into the receiving chamber of the coupling is thereby inhibited during negative pressure events—i.e., when the pressure within the receiving chamber is less than the ambient pressure (such as may occur upon withdrawal of a male probe from the receiving chamber).

The ends of ring-shaped seal 200 each have an annular groove 206 open to an end surface of seal 200. Hydraulic fluid, under pressure, can enter one or both of grooves 206,206' through the open end of the groove. Inasmuch as the distal portion of seal 200 is substantially at ambient pressure (typically, a lower pressure than that of the hydraulic fluid), a pressure differential is established which exerts an outward, radial force on sealing surface 207. This force acts to increase the sealing effectiveness of seal 200 to the body of the coupling member in which it is installed by increasing the pressure on sealing surface 207. Sealing projections 205 may act as a "living hinge" or flexure bearing. In female coupling members having a seal cartridge, the outward, radial force acts to increase the sealing effectiveness of seal 200 to the seal cartridge. In female coupling members not having a seal retainer or seal cartridge (such as that illustrated in FIG. 1), the outward, radial force acts to increase the sealing effectiveness of seal 200 directly to the body of the female coupling member.

In negative pressure situations—i.e., wherein the pressure within the receiving chamber of the female coupling member is lower than the ambient pressure such as often occurs during probe withdrawal, the pressure differential between cavity 204 and cavity 206 creates an outward, radial force against the distal pressure-energized sealing surface 207 increasing the sealing effectiveness. As shown in the drawing figures, sealing projections 205 may project slightly from outer surface 202 of seal 200 such that the seals are preloaded when installed in the body or seal cartridge of a female coupling member. Stated another way, the outside diameter of seal 200 may be somewhat greater at sealing surfaces 207 than at surface 202.

The symmetry of seal 200 about its midline permits its installation in a female coupling member such as the ones illustrated in FIGS. 1, 3A and 3B without regard to its orientation. This feature decreases the possibility of incorrect assembly of the coupling. A portion of the body of the female coupling member is shown in phantom in FIG. 4.

Figure 4A:
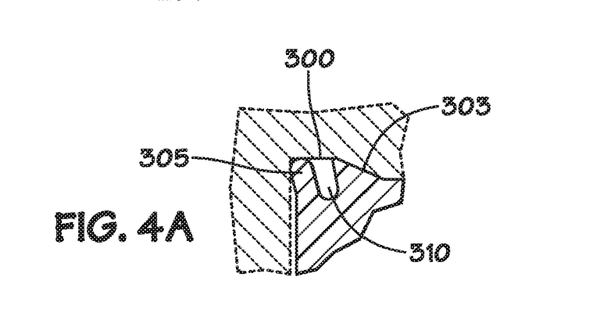
FIG. 4A is a cross-sectional view of an alternative outside corner configuration for the probe seal shown in FIG. 4.

An alternative configuration of seal 200 is shown in FIG. 4A. The end of the seal body has an outer, flat portion 300 adjacent an inner, angled portion 303 so as to fit a correspondingly configured female coupling member body or seal cartridge (shown in phantom). This gives a slightly different shape to sealing projection 305 and annular groove 310.

Figure 5:
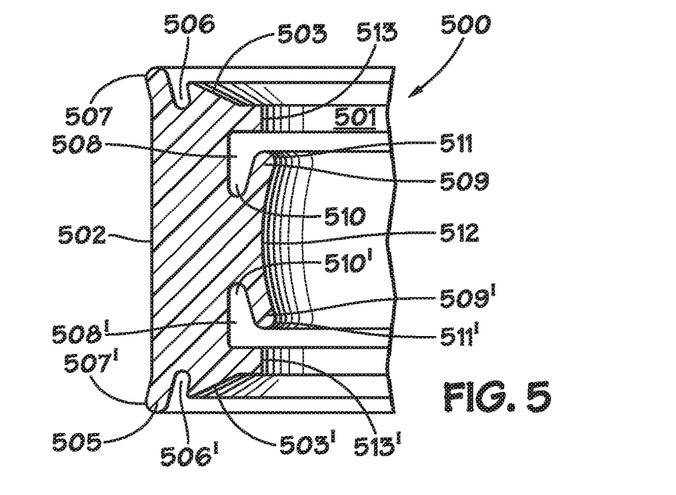
FIG. 5 is a cross-sectional view of a probe seal according to a third embodiment of the invention.

A third embodiment of a pressure-energized probe seal according to the invention is shown in FIG. 5. Probe seal 500 features the same type of pressure-energized sealing elements on its outer surface 502 as that of probe seal 200 shown in FIG. 4. Namely, the ends of ring-shaped seal 500 each have an annular groove 506 open to an end surface of seal 500. Hydraulic fluid, under pressure, can enter one or both of grooves 506,506' through the open end of the groove. Inasmuch as the distal portion of seal 500 is substantially at ambient pressure (typically, a lower pressure than that of the hydraulic fluid), a pressure differential is established which exerts an outward, radial force on sealing surface 507. This force acts to increase the sealing effectiveness of seal 500 to the body of the coupling member in which it is installed by increasing the pressure on sealing surface 507. Sealing projections 505 may act as a "living hinge" or flexure bearing. In female coupling members having a seal cartridge, the outward, radial force acts to increase the sealing effectiveness of seal 500 to the seal cartridge. In female coupling members not having a seal retainer or seal cartridge (such as that illustrated in FIG. 1), the outward, radial force acts to increase the sealing effectiveness of seal 500 directly to the body of the female coupling member.

In negative pressure situations—i.e., wherein the pressure within the receiving chamber of the female coupling member is lower than the ambient pressure such as often occurs during probe withdrawal, the pressure differential between cavity 506 and that at surface 502 creates an outward, radial force against the distal pressure-energized sealing surface 507 increasing the sealing effectiveness. As shown in the drawing figures, sealing projections 505 may project slightly from outer surface 502 of seal 500 such that the seals are preloaded when installed in the body or seal cartridge of a female coupling member. Stated another way, the outside diameter of seal 500 may be somewhat greater at sealing surfaces 507 than at surface 502.

The pressure-energized seals on the interior surface of probe seal 500 are formed by generally L-shaped grooves 508 and 508' in inner wall 501. Grooves 508 define sealing projections (or "lips") 509 and 509' together with fluid cavities 510 and 510'. Inner wall 501 may have a curved portion 512 between straight portions 513 and 513'. Sealing projections 509 may project slightly from inner wall 501 so as to provide a preload to the seals when the probe element of a male coupling member is inserted. Stated another way, the inside diameter of probe seal 500 may be slightly smaller at sealing surface 511 than at flat portion 513. As will be appreciated by those skilled in the art, if fluid pressure in chamber 510 (or 510') exceeds that at surface 512, sealing projection 509 (or 509') will be urged in an inward, radial direction, thereby enhancing the sealing effectiveness of sealing surface 511 (or 511') to the probe of a male coupling member inserted in the female coupling member holding probe seal 500.

Figure 6:
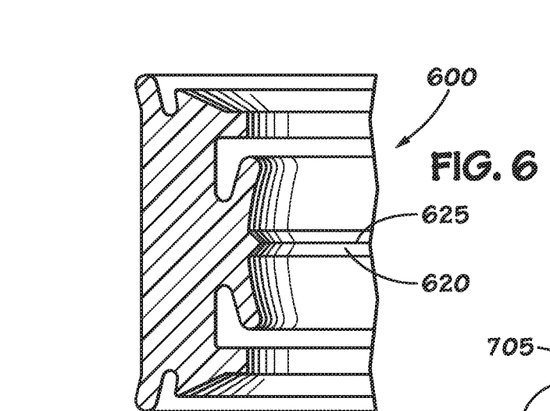
FIG. 6 is a cross-sectional view of a probe seal according to a fourth embodiment of the invention.

FIG. 6 shows a fourth embodiment of the invention which is a variation of the third embodiment (illustrated in FIG. 5). Probe seal 600 has the same pressure-energized seals as the probe seal shown in FIG. 5. However, probe seal 600 has an additional radial sealing projection 620 at its midline. Sealing projection 620 may be generally triangular in cross section with apex 625 projecting into the central cavity. Sealing projection 620 may help align the probe member of a corresponding male coupling member during insertion.

Figure 7A:
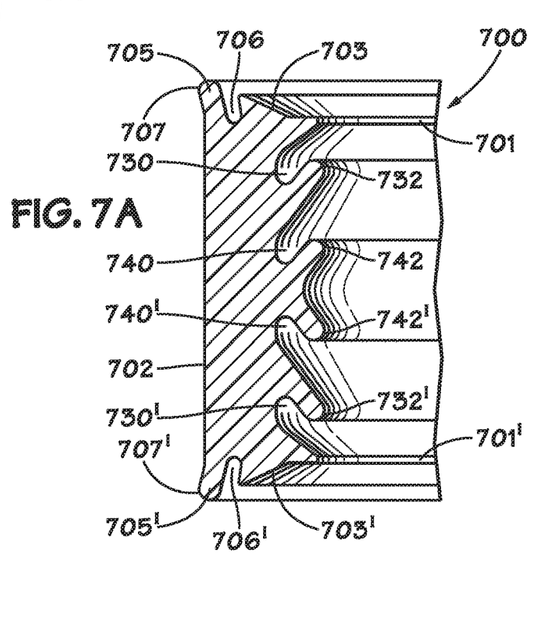
FIG. 7A is a cross-sectional view of a probe seal according to a fifth embodiment of the invention.
Figure 7B:
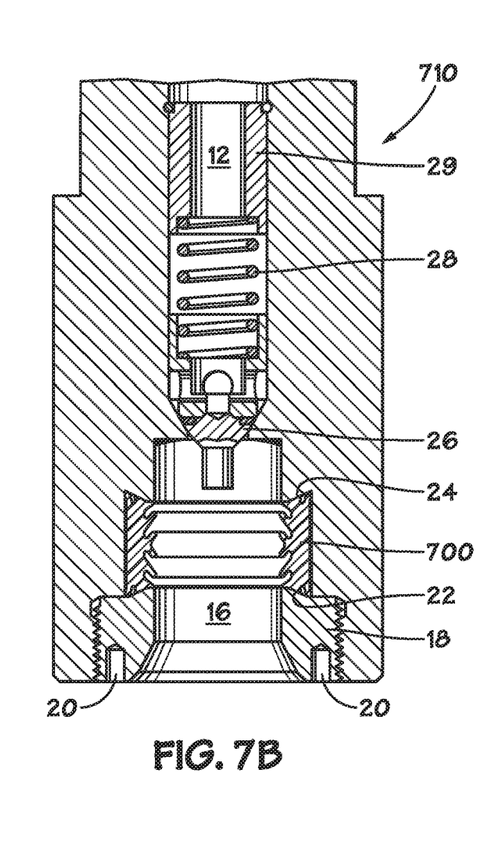
FIG. 7B is a cross-sectional view of a female hydraulic coupling member that incorporates the probe seal shown in FIG. 7A.

A fifth embodiment of the invention is shown in FIGS. 7A and 7B. Probe seal 700 has the same type of pressure-energized sealing elements on its outer surface as that described above in reference to probe seals 200, 500 and 600. Specifically, the ends of ring-shaped seal 700 each have an annular groove 706 open to an end surface of seal 700. Hydraulic fluid, under pressure, can enter one or both of grooves 706,706' through the open end of the groove. Inasmuch as the distal portion of seal 700 is substantially at ambient pressure (typically, a lower pressure than that of the hydraulic fluid), a pressure differential is established which exerts an outward, radial force on sealing surface 707. This force acts to increase the sealing effectiveness of seal 700 to the body of the coupling member in which it is installed by increasing the pressure on sealing surface 707. Sealing projections 705 may act as a "living hinge" or flexure bearing. In female coupling members having a seal cartridge, the outward, radial force acts to increase the sealing effectiveness of seal 700 to the seal cartridge. In female coupling members not having a seal retainer or seal cartridge (such as that illustrated in FIG. 1), the outward, radial force acts to increase the sealing effectiveness of seal 700 directly to the body of the female coupling member.

In negative pressure situations—i.e., wherein the pressure within the receiving chamber of the female coupling member is lower than the ambient pressure such as often occurs during probe withdrawal, the pressure differential between cavity 706 and that at surface 702 creates an outward, radial force against pressure-energized sealing surface 707' increasing the sealing effectiveness. As shown in the drawing figures, sealing projections 705 may project slightly from outer surface 702 of seal 700 such that the seals are preloaded when installed in the body or seal cartridge of a female coupling member. Stated another way, the outside diameter of seal 700 may be somewhat greater at sealing surfaces 707 than at surface 702.

Probe seal 700 features a plurality of pressure-energized seals on its interior surface. These pressure-energized seals are formed by outer angled grooves 730 and 730' and inner angled grooves 740 and 740' in inner wall 701 of seal 700. Probe seal 700 may be symmetric about its midline thereby obviating "reverse" installation in a female coupling member. Grooves 730 and 740 form sealing lips 732 and 742.

As will be appreciated by those skilled in the art, when fluid pressure within grooves 730 and/or 740 exceeds the fluid pressure at surface 701', sealing lips 732 and 742, respectively, will be urged in an inner, radial direction thereby enhancing their sealing effectiveness. Conversely, when fluid pressure within grooves 730' and/or 740' exceeds the fluid pressure at surface 701, sealing lips 732' and 742', respectively, will be urged in an inner, radial direction thereby enhancing their sealing effectiveness. In this way, a pressure-energized seal is provided under both "positive" and "negative" pressure conditions—i.e., both during coupled operation of the coupling (when hydraulic fluid pressure exceeds the ambient pressure) and during probe withdrawal or loss of hydraulic pressure (when the ambient pressure of the surrounding seawater exceeds the pressure at the inner end of the receiving chamber).

Because of the plurality of pressure-energized seals on the inner surface of seal 700, it may be desirable to provide the body of seal 700 with a somewhat larger axial dimension than that of seals 30, 200, 500 and 600, described above. However, a greater axial dimension would necessitate a female coupling member of different dimensions. Such a coupling member is shown in FIG. 7B as coupling member 710. Coupling 710 is of the same general design as that shown in FIG. 1. However, in coupling 710, the distance between angled shoulder 24 and angled surface 22 is increased in order to accommodate the longer length of pressure-energized probe seal 700.

Although the invention has been described in detail with reference to certain preferred embodiments, variations and modifications exist within the scope and spirit of the invention as described and defined in the following claims.

What is claimed is:

1. A female hydraulic coupling member comprising:
  a generally cylindrical body having a central axial bore;
  a shoulder within the central axial bore disposed at an acute angle to the longitudinal axis of the generally cylindrical body; and,
  a probe seal within the central axial bore comprising:
    a generally ring-shaped body having a first end, an opposing second end, a generally cylindrical outer wall and a generally cylindrical inner wall;
    a first annular groove in the inner wall having a generally T-shaped cross section formed by a radial portion which intersects an axial portion, the first annular groove sized and configured such that fluid pressure within the axial portion will urge an adjacent portion of the inner wall in a radially inward direction; and, a second annular groove in the outer wall having a radial portion which intersects an axial portion, the second annular groove sized and configured such that fluid pressure within the axial portion will urge an adjacent portion of the outer wall in a radially outward direction.

* * * * *